(12) United States Patent
Wilson et al.

(10) Patent No.: US 7,270,453 B2
(45) Date of Patent: Sep. 18, 2007

(54) HEAT RESISTANT PLASTIC LAMP COMPONENTS AND METHODS OF FORMING

(75) Inventors: James R. Wilson, Troy, MI (US); Peter Zuber, Pittsfield, MA (US)

(73) Assignee: General Electric Company, Schenectady, NY (US)

( * ) Notice: Subject to any disclaimer, the term of this patent is extended or adjusted under 35 U.S.C. 154(b) by 448 days.

(21) Appl. No.: 11/018,638

(22) Filed: Dec. 21, 2004

(65) Prior Publication Data

US 2006/0133102 A1   Jun. 22, 2006

(51) Int. Cl.
*F21V 101/10* (2006.01)
(52) U.S. Cl. .................. 362/516; 362/518; 359/820
(58) Field of Classification Search ........... 362/516, 362/518, 296, 297, 341, 346; 359/820
See application file for complete search history.

(56) References Cited

U.S. PATENT DOCUMENTS

| | | | |
|---|---|---|---|
| 4,380,794 A | 4/1983 | Lawson | |
| 4,658,178 A | 4/1987 | Bradley | |
| 4,939,340 A | 7/1990 | Brill | |
| 4,988,912 A | 1/1991 | Borgis | |
| 5,014,174 A * | 5/1991 | Won et al. | 362/309 |
| 5,889,360 A | 3/1999 | Frey et al. | |
| 6,773,149 B2 | 8/2004 | Kulkarni et al. | |
| 6,815,878 B2 | 11/2004 | Bryant | |
| 2003/0178926 A1 | 9/2003 | Bryant | |

FOREIGN PATENT DOCUMENTS

| | | |
|---|---|---|
| EP | 0229429 B1 | 4/1993 |
| JP | 2001142821 | 11/2002 |
| WO | WO 02/075863 A1 | 9/2002 |

\* cited by examiner

*Primary Examiner*—Laura Tso
(74) *Attorney, Agent, or Firm*—Armstrong Teasdale LLP

(57) ABSTRACT

A molded plastic lamp component includes, in an exemplary embodiment, a first portion formed from a first material having a first heat distortion temperature, and a second portion formed from a second material having a second heat distortion temperature. The first heat distortion temperature is higher than the second heat distortion temperature.

21 Claims, 1 Drawing Sheet

HEAT RESISTANT PLASTIC LAMP COMPONENTS AND METHODS OF FORMING

BACKGROUND OF THE INVENTION

This invention relates generally to plastic components for lamps, and more particularly to plastic headlamp components formed from multiple resins having different heat distortion temperatures.

A variety of thermoplastic materials are available in the marketplace for use in automotive lighting systems. A basic criterion for material selection in lighting systems is the heat distortion temperature of the material. In general, the higher the heat distortion temperature, the higher the cost of the thermoplastic. The heat distortion temperature is the temperature at which the components begin to soften and distort under a specified force. If the component is a headlamp reflector, the temperature experienced by the reflector can be affected by design considerations such as reflector diameter, bulb diameter, bulb depth, lens depth, spacer depth and reflector depth.

One problem that has been observed is that some metallized thermoplastic lamp components, when heated to temperatures close to their heat distortion temperature become hazy in appearance which affects the performance and/or aesthetics of the lamp component. Also, some unmetallized thermoplastics can distorted unacceptably when heated above their heat distortion temperature. Using thermoplastics having higher heat distortion temperature characteristics to form the entire component can sometimes alleviate the problem. However, higher heat distortion temperature materials are generally more expensive and can exhibit undesirable flow characteristics which can affect molding operations.

BRIEF DESCRIPTION OF THE INVENTION

In one aspect, a molded plastic lamp component is provided. The lamp component includes a first portion formed from a first material having a first heat distortion temperature, and a second portion formed from a second material having a second heat distortion temperature. The first heat distortion temperature is higher than the second heat distortion temperature.

In another aspect, a method of fabricating a light component is provided. The method includes forming a first portion of the component from a first material having a first heat distortion temperature, and forming a second portion of the component from a second material having a second heat distortion temperature. The first heat distortion temperature is higher than the second heat distortion temperature.

In another aspect, a method of fabricating a composite lamp component is provided. The method including forming a first portion from a first material having a first heat distortion temperature, and molding a second portion around the first portion from a second material having a second heat distortion temperature to form a composite material lamp component. The first heat distortion temperature is higher than the second heat distortion temperature.

DETAILED DESCRIPTION OF THE INVENTION

Plastic automotive headlamp components formed from multiple plastic resins having different heat distortion temperatures are described below in detail. The lamp components include a portion formed from a material having a higher heat distortion temperature (HDT) than the material used to form the remaining portions of the lamp component. The areas of the lamp component that are exposed to high temperatures caused by convection impingement of hot air from the lamp bulb and/or a surrounding bulb shield, are formed from the higher HDT material. The remaining areas of the lamp component are formed from materials with lower HDT materials to reduce costs and to facilitate molding the component.

The lamp components can be formed by an insert molding process where a two component part is produced by a two step process. The first step is the production of an insert from the higher HDT material. The second step includes placing the insert in a mold and the lower HDT material is then molded on top of or adjacent to the insert to produce a lamp component made of two different materials. The lamp components can also be formed by a two-shot molding process where both the high HDT and low HDT materials are both injected in the same molding cycle into one mold having the capability to reconfigure from one mold cavity configuration to another cavity configuration. Although automotive lamp components are described, other types of lamp components, other than automotive type lamps, can by formed in a similar manner.

Figure 1:
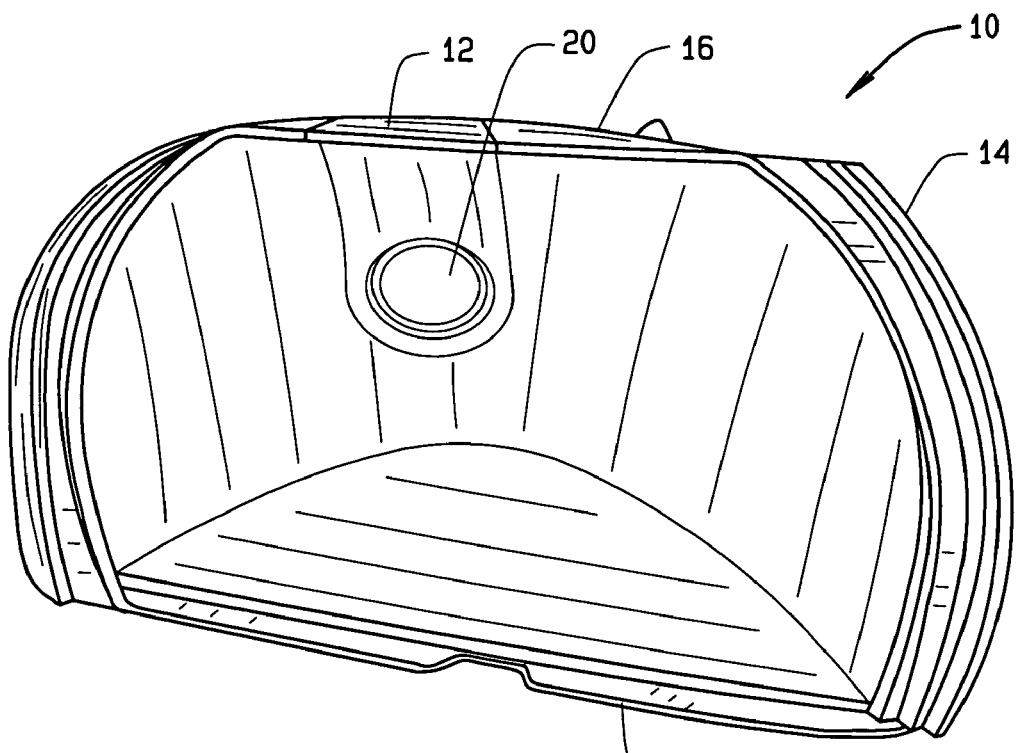
FIG. 1 is an illustration of a automotive headlamp reflector in accordance with an embodiment of the present invention.

Referring to the drawings, FIG. 1 is an illustration of a automotive headlamp reflector 10. In an exemplary embodiment, reflector 10 includes a first portion 12 and a second portion 14. First portion 12 extends from a top side 16 of reflector 10 at least partially to a bottom side 18 of reflector 10. A bulb opening 20 extends through first portion 12. Second portion 14 makes up the remainder of reflector 10. First portion 12 is formed from a first material and second portion 14 is formed from a second different material. The HDT of the first material is higher than the HDT of the second material. In one embodiment, the HDT of the first material is at least about 15° C. higher than the HDT of the second material, in another embodiment, the HDT of the first material is at least about 20° C. higher than the HDT of the second material, and in another embodiment, the HDT of the first material is at least about 25° C. higher than the HDT of the second material.

The majority of reflector 10, second portion 14, is formed from the lower HDT material, for example, a thermoplastic material. Suitable thermoplastics include, but are not limited to, polycarbonates, polyestercarbonates, polyetherimides, polyarylene ethers, polyolefins, including polymethylene, polyethylene, and polypropylene, polystyrene, acrylonitrylstyrene, butadiene, polyesters, including polyethyleneterephthalate, polybutyleneterephthalate, and polypropyleneterephthalate, polybutyleneterachlorate, and polyvinyl chloride, acrylics, including polymethyl methacrylate, acrylonitrile-butylacrylate-styrene polymers, amorphous nylon, and blends of these materials with each other or other polymeric materials.

First portion 12 includes less than 50 percent of the surface area of reflector 10 and is the minor portion of reflector 10. As explained above, first portion 12 is formed from a material having a higher HDT than the material used to form second portion 14, for example, thermoplastics, including polyether imides, polycarbonates, and polyarylates, glass, thermosetting plastics, including acrylics, epoxies and polyesters, ceramics, and metals, including steel and aluminum alloys.

Reflector 10 can be formed by "two-component" molding methods, for example, insert molding and two-shot molding. Using the insert molding process, first portion 12 is formed as an insert from the higher HDT material in a first mold. Specifically, molten plastic is injected into the first mold under pressure, and then cooled to solidify the plastic to form the insert. When metal is used to form the insert, the metal insert is formed by any suitable method, for example, stamping, casting, or the like. The insert is then positioned in the final part mold and the lower HDT material used to form second portion 14 is molded on top of or adjacent to the insert creating reflector 10. Specifically, molten plastic material is injected into the final part mold under pressure, and then cooled to solidify the plastic to form reflector 10.

Using the two-shot molding process in one embodiment, both the high HDT and low HDT materials are both injected in the same mold having the capability to reconfigure from one mold cavity configuration to another cavity configuration. Particularly, first portion 12 is formed by injecting the high HDT material into the first mold cavity configuration under pressure, then cooling the material. The mold is then reconfigured to a second mold cavity configuration and the low HDT material is injected into the second mold cavity and then cooled to form second portion 14 and reflector 10.

The above described reflector 10 is formed from a relatively small amount of high HDT material (first portion 12) and a relatively large amount of the lower HDT material (second portion 14) which is less expensive than the high HDT material. The above described reflector 10 provides an economical solution to heat distortion and hazing problems associated with high temperature air currents or direct thermal radiation caused by the lamp bulb.

Figure 2:
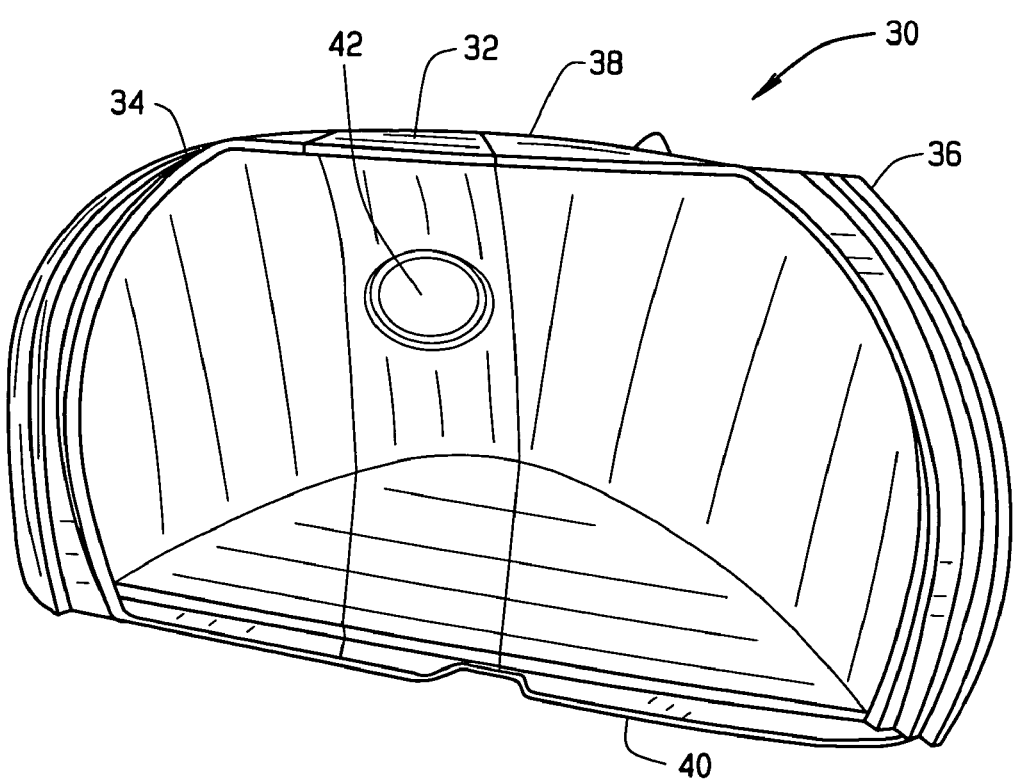
FIG. 2 is an illustration of a automotive headlamp reflector in accordance with another embodiment of the present invention.

In an alternate embodiment, illustrated in FIG. 2, a reflector 30 includes a first portion 32, a second portion 34, and a third portion 36. First portion 32 extends from a top side 38 of reflector 30 to a bottom side 40 of reflector 30. A bulb opening 42 extends through first portion 32. Second and third portions 34 and 36 make up the remainder of reflector 30. First portion 32 is formed from a first material and second and third portions 34 and 36 are formed from a second different material. The HDT of the first material is higher than the HDT of the second material. In further alternate embodiments, there are at least one additional portion formed from the higher HDT material.

While the invention has been described in terms of various specific embodiments, those skilled in the art will recognize that the invention can be practiced with modification within the spirit and scope of the claims.

What is claimed is:

1. A molded lamp component comprising:
    a first portion formed from a first material having a first heat distortion temperature, said first portion comprising less than 100% of an area of the lamp component and having a front side, a back side and at least one side edge; and
    a second portion formed from a second material having a second heat distortion temperature, said second portion positioned laterally adjacent said at least one side edge of said first portion and comprising the remaining area of the lamp component, said first heat distortion temperature greater than said second heat distortion temperature.

2. A molded lamp component in accordance with claim 1 wherein said first material comprises at least one of a thermoplastic material, a thermosetting plastic material, a ceramic material, and a metal material.

3. A molded lamp component in accordance with claim 1 wherein said second material comprises a thermoplastic material.

4. A molded lamp component in accordance with claim 1 wherein a difference between said first heat distortion temperature and said second heat distortion temperature comprises at least about 20° C.

5. A molded lamp component in accordance with claim 1 further comprising at least one additional portion formed from said second material.

6. A molded lamp component in accordance with claim 1 further comprising at least one additional portion formed from the first material.

7. A method of fabricating a lamp component, said method comprising:
    forming a first portion of the component from a first material having a first heat distortion temperature, the first portion comprising less than 100% of an area of the lamp component and having a front side, a back side and at least one side edge; and
    forming a second portion of the component from a second material having a second heat distortion temperature, the second portion positioned laterally adjacent the at least one side edge of the first portion and comprising the remaining area of the lamp component, the first heat distortion temperature higher than the second heat distortion temperature.

8. A method in accordance with claim 7 wherein forming a first portion of the component comprises molding the first portion from the first material.

9. A method in accordance with claim 7 wherein molding the first portion of the component comprises:
    injecting the first material into a first mold under pressure; and
    cooling the first material to form the first portion.

10. A method in accordance with claim 7 wherein forming a second portion of the component comprises molding the second portion from the second material.

11. A method in accordance with claim 10 wherein molding the second portion of the component comprises:
    positioning the first portion in a second mold;
    injecting the second material into the second mold under pressure; and
    cooling the second material to form the lamp component.

12. A method in accordance with claim 8 wherein molding the first portion comprises:
    injecting the first material under pressure into a first cavity area of a mold;
    cooling the first material to form the first portion;
    realigning the mold to form a second cavity area in the mold surrounding the first portion;
    injecting the second material under pressure into the second cavity area to over-mold the first portion; and
    cooling the second material to form the lamp component.

13. A method in accordance with claim 7 wherein the first material comprises at least one of a thermoplastic material, a thermosetting plastic material, a ceramic material, and a metal material.

14. A method in accordance with claim 7 wherein the second material comprises a thermoplastic material.

15. A method in accordance with claim 7 wherein a difference between the first heat distortion temperature and the second heat distortion temperature comprises at least about 20° C.

16. A method of fabricating a composite lamp component comprising:
   forming a first portion from a first material having a first heat distortion temperature, and molding a second portion around the first portion from a second material having a second heat distortion temperature to form a composite material lamp component, the first heat distortion temperature higher than the second heat distortion temperature.

17. A method in accordance with claim 16 wherein forming a first portion comprises molding the first portion in a first mold, and said molding a second portion comprises:
   positioning the first portion in a second mold;
   injecting the second material into the second mold under pressure; and
   cooling the second material to form the lamp component.

18. A method in accordance with claim 16 wherein molding the first part comprises:
   molding the first material in a first cavity area of a mold to form the first portion;
   realigning the mold to form a second cavity area in the mold surrounding the first portion;
   molding the second material in the second cavity area to form the lamp component.

19. A method in accordance with claim 16 wherein the first material comprises at least one of a thermoplastic material, a thermosetting plastic material, a ceramic material, and a metal material.

20. A method in accordance with claim 16 wherein the second material comprises a thermoplastic material.

21. A method in accordance with claim 16 wherein a difference between the first heat distortion temperature and the second heat distortion temperature comprises at least about 20° C.

* * * * *